Figure 1:
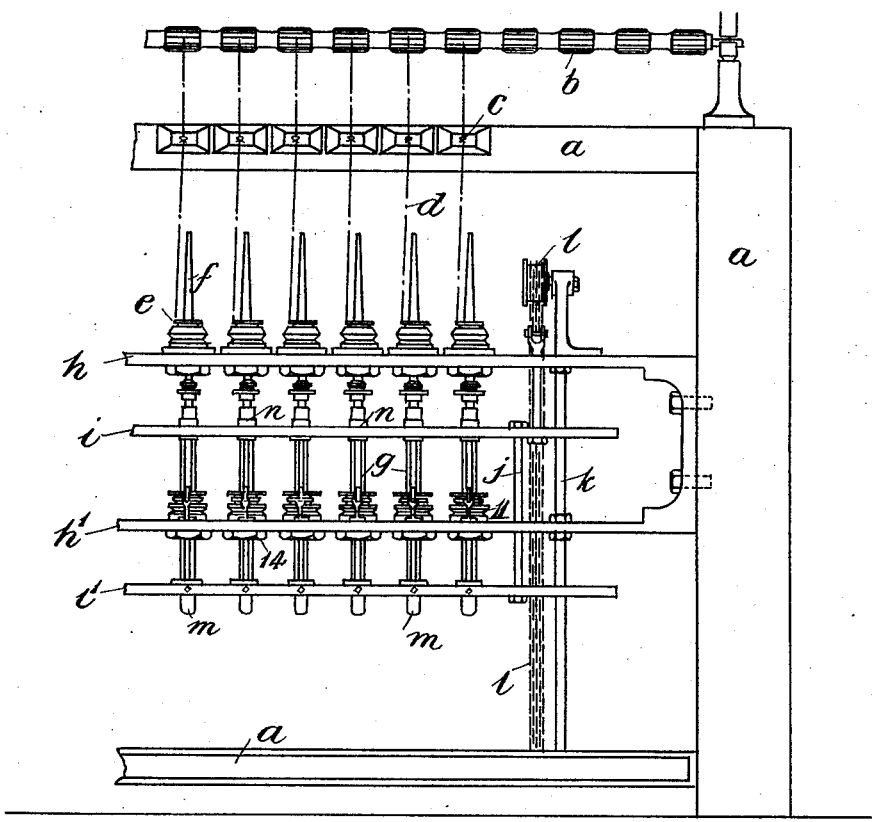

A. E. DREW, J. ARKINSTALL & W. DEAN.
APPARATUS AND MEANS FOR SPINNING, DOUBLING, AND FORMING COPS.
APPLICATION FILED MAR. 11, 1911.

1,030,261.

Patented June 18, 1912.

4 SHEETS—SHEET 1.

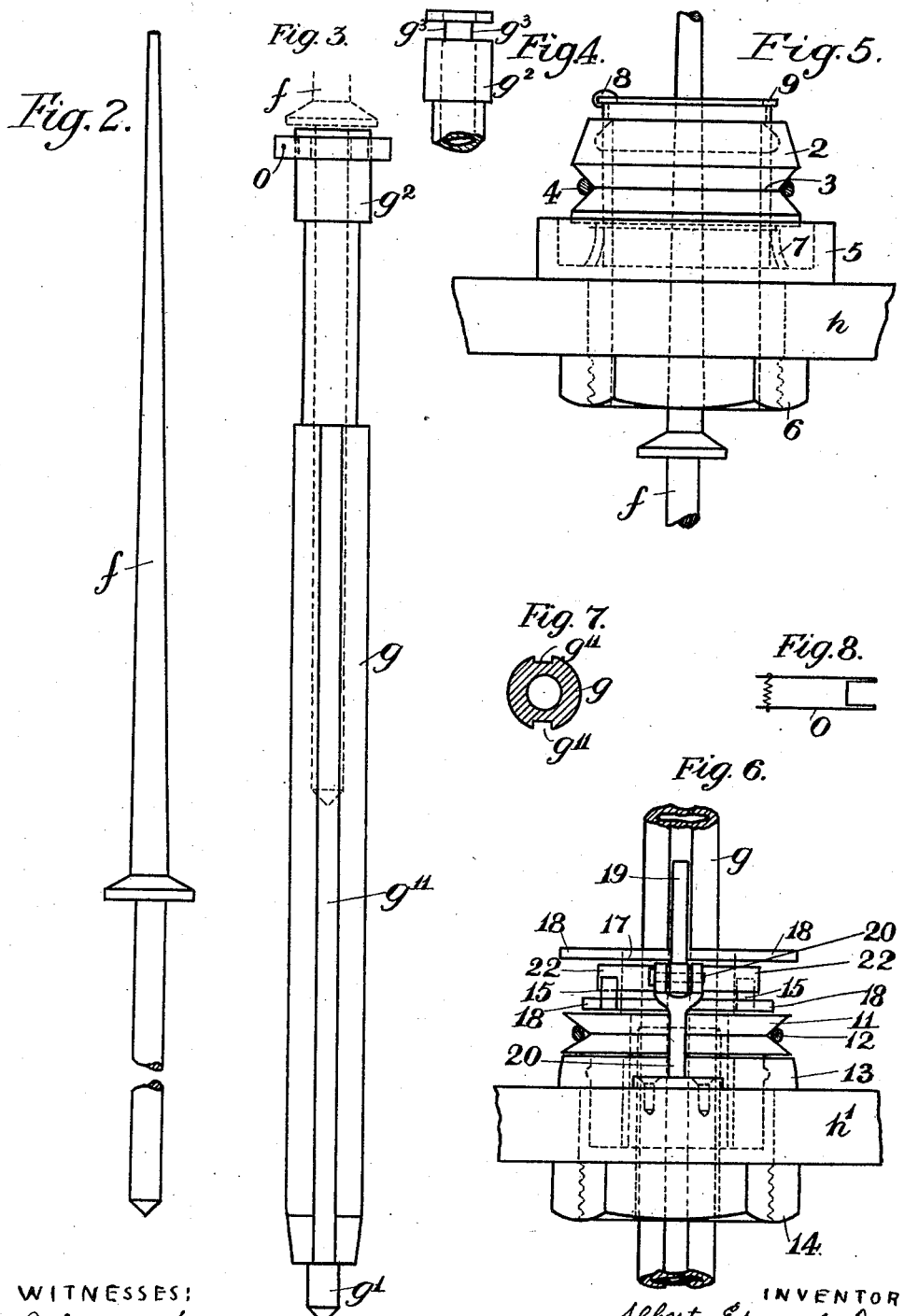

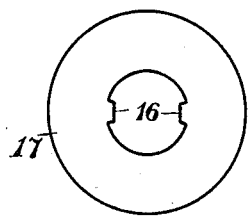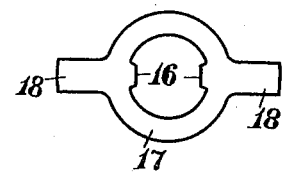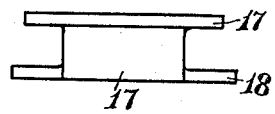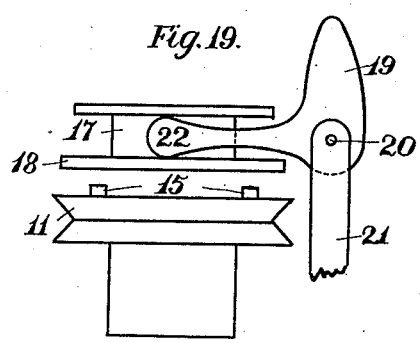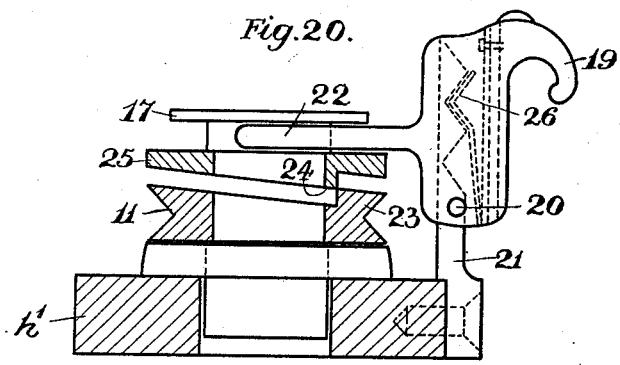

UNITED STATES PATENT OFFICE.

ALBERT EDWARD DREW, JOSEPH ARKINSTALL, AND WILLIAM DEAN, OF BOLTON, ENGLAND.

APPARATUS AND MEANS FOR SPINNING, DOUBLING, AND FORMING COPS.

1,030,261.  Specification of Letters Patent.  Patented June 18, 1912.

Application filed March 11, 1911. Serial No. 613,834.

*To all whom it may concern:*

Be it known that we, ALBERT EDWARD DREW, of 566 Chorley Old Road, Bolton, in the county of Lancaster, England, JOSEPH ARKINSTALL, of 3 Blackburn Road, Bolton aforesaid, and WILLIAM DEAN, of 2 Joseph street, Bolton, aforesaid, subjects of the King of Great Britain, have invented certain new and useful Improvements in or Relating to Apparatus and Means for Spinning, Doubling, and Forming Cops, of which the following is a specification.

This invention refers to improvements in or relating to apparatus and means for spinning, doubling and forming cops on the bare spindle on frames of the ring or flier type and consists in providing on a suitable rail a loose but controlled spindle in a driven tube or socket, the loose spindle being able to accommodate itself to the variations of the tension of the yarn according to requirements in the formation of the cop. A twister is provided on a suitable rail for putting the required twist into the yarn, and consists of a driven ring large enough for the cop to pass through. This ring or twister is provided with a wharve for driving purposes, and rotates on a bearing fitted on the rail. Travelers, eyes or slots through which the yarn is led are provided on or in the rim of the driven ring, or twister, which is driven independently of the tube or socket containing the loose spindle.

We are aware that it has been previously proposed to mount on the top rail positively driven twisting rings working in combination with a spindle having a loose blade or a loosely fitting sleeve or part carried by or taking the place of the spindle blade, the spindle rising and falling in the twisting ring, or it might be the twisting ring rising and falling so as to effect the building of the cop, the spindle being either driven at a greater speed than the twisting ring or alternatively running at a less speed, and in the latter case a braking appliance would be applied to the spindle or loosely fitting sleeve or part taking the place of the spindle blade. We are also aware that it has been previously proposed to mount spindles loosely in sockets driven differentially relatively to a cup flier or twister, but in this case the socket was formed in the upper part of a driven spindle. We are further aware that it is not broadly new to mount spindles loosely in driven sockets and to drive both the spindles and sockets positively, a differential gear between the two being employed.

Our present improvements consist essentially in a novel combination of parts comprising driven rising and falling tubes or sockets carried in lifting rails; spindles mounted loosely but controlled in the driven sockets; means for effecting driving engagement with and disengaging the spindle sockets from their driving wharves; driven rings or twisters, carried in a stationary rail, and provided with travelers, eyes or slots, the sockets with the loose but controlled spindles being driven at a slightly quicker rate than the ring twisters through which the spindles are moved up and down by the lifting rails. We illustrate such a combination in the accompanying four sheets of drawings which we will now proceed to describe.

Figure 9:
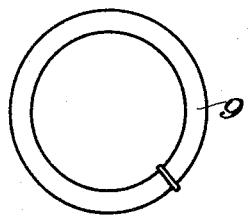
Figure 12:
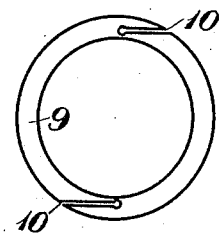
Figure 10:
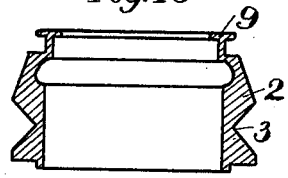
Figure 11:
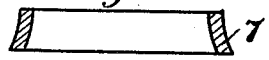
Figure 13:
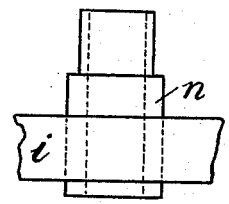
Figure 14:
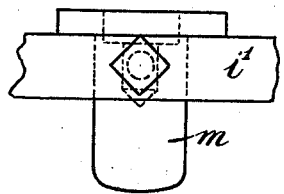
Figure 15:
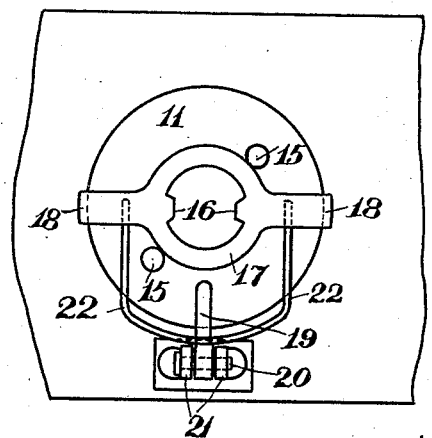

Figure 1 is part of a ring spinning or doubling frame to which our improvements are applied. Fig. 2 is an elevation of one of the spindles. Fig. 3 is an elevation of the driven tube or socket with the position of the spindle therein indicated by dotted lines. Fig. 4 is another elevation of the top of said tube or socket. Fig. 5 is a view of part of the top stationary rail showing part of the spindle, one of the driven rings or twisters and its fixed bearing or support. Fig. 6 is a view of part of the lower stationary rail, showing part of the driven tube or spindle socket and a device for connecting or disconnecting the same from its driving wharve. Fig. 7 is a cross section of the spindle socket. Fig. 8 is a plan of a suitable spring device for clipping the sides of the spindle through slots near the top of the tube or socket as shown in Fig. 3. Figs. 9 and 10 are plan and vertical section respectively of the driven ring and loose traveler and Fig. 11 is a detail view of an idle ring or washer upon which the driven ring or twister is rotated. Fig. 12 is a view of a nicked driven ring as an alternative for the ring and loose traveler. Fig. 13 is a view of part of the top lifting rail with one of the bolster bearings. Fig. 14 is a view of part of the bottom lifting rail with one of the footstep bearings. Fig. 15 is a plan of Fig. 6 with the driving tube or socket removed. Figs. 16 to 19 illustrate a slightly modified construction for connecting the spindle socket to its driving wharve, and Fig. 20 is an alternative arrangement for the same purpose.

In these views:—$a$ designates the frame of the machine; $b$ the bottom row of drawing rollers; $c$ guides over which the threads $d$ pass on their way to the ring twister $e$; $f$ the loose spindles; $g$ the spindle tubes or sockets; $h$ the top and $h'$ the bottom stationary rail; $i$ the top and $i'$ the bottom lifting rail; $j$ one of the stays for connecting the top and bottom lifting rails; $k$ one of the stationary guides for the lifting rails; $l$ one of the chains secured to the lifting rails $i$ $i'$ for raising and lowering the same and thereby imparting the required rising and falling motion to the driven spindle tubes or sockets $g$ and spindles $f$.

Each loose spindle $f$, one of which is shown detached in Fig. 2, is fitted as shown best in the detail view Fig. 3 in a driven tube or socket $g$. The driven ring or twister $e$ may be constructed in any convenient way as for example as illustrated best in the detail view Fig. 5, where the ring or twister comprises a combined body and wharve 2 grooved at 3 to receive a band 4 driven from a tin drum or other convenient part, not shown. This body 3 is mounted upon a boss or cup 5 which is fixed in the stationary rail $h$ by a nut 6 and the combined body and wharve 2 rotates upon an idle ring or washer 7 shown detached in Fig. 11. A traveler 8 is mounted on the ring 9 of the combined body and wharve 2 in the construction Figs. 5 and 9, and the thread passes through such traveler on its way to the bare spindle $f$, or alternatively the thread passes through eyes or slots 10, see Fig. 12, formed in the upper surface of the nicked driven ring 9 instead of employing a loose traveler. The spindle tube or socket $g$ has a footstep $g'$ formed upon it, see Fig. 3, and this footstep is supported in a footstep bearing $m$ secured in the lower lifting rail $i'$ as shown best in the detail view Fig. 14. The spindle tube or socket $g$ is also supported and guided as shown best in Fig. 13 by a bolster bearing $n$ held in the upper lifting rail $i$. The spindle tube or socket $g$ containing the loose spindle $f$ is driven by a wharve 11 and band 12 in any convenient and known manner at a quicker rate of speed than that of the driven ring or twister $e$, and driving connection between the spindle socket $g$ and the wharve 11, through which it slides vertically up and down, is effected by any suitable means. For example we show three ways of making the driving connection. The first way, as illustrated in the detail views Figs. 6 and 15, shows the wharve 11 mounted on a tubular bearing 13 fixed in the lower stationary rail $h'$ by means of a nut 14. On the upper side of the wharve 11 are formed or fixed pegs or projections 15 and in grooves $g''$ on the socket $g^2$ are fitted projections 16, Figs. 16 and 17, on a collar 17 formed with a flange on the upper side and arms on the under side or with double arms 18, see Fig. 18. An elbow lever 19 is pivoted at 20 in a bracket 21 and terminates in a fork 22, the two prongs of which enter between the double arms 18 of the collar 17. When, therefore, the collar 17 is lying with its lower arms 18 on the upper surface of the wharve 11 the pegs or projections 15 rotating with the wharve meet the lower arms 18 and so carry around the collar 17 and with it the spindle socket $g$.

In the arrangement illustrated by Figs. 16 to 19 the construction of some of the parts is slightly modified, as shown, but the principle of working is substantially identical with that already described.

In the alternative arrangement for the same purpose illustrated by Fig. 20, clutch or catch teeth 23, 34, are formed respectively on the upper side of the wharve 11 and on the underside of a flange 25 formed on the collar 17. When the teeth 23 and 24 are engaged there is driving connection between the wharve 11 and the spindle socket $g$ but when the elbow lever 19 is released from the position shown in Fig. 20 a spring 26, put into compression by the act of raising the teeth 24 out of gear with the teeth 23, operates to return the same into driving connection again.

Although the spindle $f$ fits loosely in its driving tube or socket $g$, with which it rises and falls, it is nevertheless rotated with it, this being insured in any convenient manner. For example as shown in Figs. 3 and 4 a cap $g^2$ is screwed or otherwise fixed upon the socket $g$ and grooves $g^3$ are cut on opposite sides of this cap and a spring clip $o$ shown detached in plan, Fig. 8, is sprung into the slots $g^3$ and embraces lightly the projecting sides of the spindle $f$. The spindle $f$ fits with such ease or freedom in its socket $g$ that its velocity is retarded as required merely by the pull or tension of the yarn according to the varying diameters formed during the building of the cop and in order to insure an even tension of the yarn throughout. The lifting rails $i$ $i'$, which move up and down during the formation of the cop are moved sufficiently rapidly by their actuating chains $l$ or suitable equivalents during the motion which effects the crossing of the yarn on the cop in order to give only a few turns of yarn in the required direction, as in the case of mule spinning, and this action is rendered possible under our invention by the fact that the loose spindle $f$ accommodates itself to the extra tension put upon the yarn during such rapid movement.

In order to vary the speed of the tin drum or other part which drives through the bands 12 the tubes or sockets $g$ containing the loose spindles $f$, or the ring twisters as the case may be, according to the different counts to be spun, change wheels are provided in the gearing in the well known way in order to produce the different speeds required.

What we claim is:—

1. In a ring spinning or doubling frame, in combination, driven rising and falling tubes or sockets carried in lifting rails; spindles yieldingly mounted in the driven sockets; driving wharves; means for effecting driving engagement with and disengaging the spindle sockets from their driving wharves; driven rings or twisters surrounding said spindles, said rings being carried in a stationary rail, and provided with travelers, the sockets with the yieldingly mounted spindles being driven at a slightly quicker rate than the ring twisters through which the spindles are moved up and down by the lifting rails, all substantially as and for the purposes herein set forth.

2. In a ring spinning or doubling frame, in combination, the yieldingly mounted spindles $f$; the driven slotted sockets $g$; driving wharves 11 and bands 12; means for effecting driving engagement between the spindle sockets and the driving wharves through which the said sockets slide up and down; controlling means such as the slotted caps $g^2$ and spring clips $o$ embracing said spindles $f$; lifting rails $i$ $i'$, provided with bearings such as $m$ and $n$ for supporting and carrying the driven sockets and spindles; driven ring twisters $e$ surrounding said spindles, through which the spindles rise and fall, the sockets $g$ with the said spindles $f$ being driven at a quicker rate of speed than the ring twisters, all substantially as and for the purposes herein set forth.

In testimony whereof we have signed our names to this specification in the presence of two subscribing witnesses.

ALBERT EDWARD DREW.
JOSEPH ARKINSTALL.
WILLIAM DEAN.

Witnesses:
THOS. THORNLEY,
JOHN HENRY HOWARTH.

---

Copies of this patent may be obtained for five cents each, by addressing the "Commissioner of Patents, Washington, D. C."